J. E. COVENEY.
Draft Equalizer.
No. 87,471. Patented March 2, 1869.
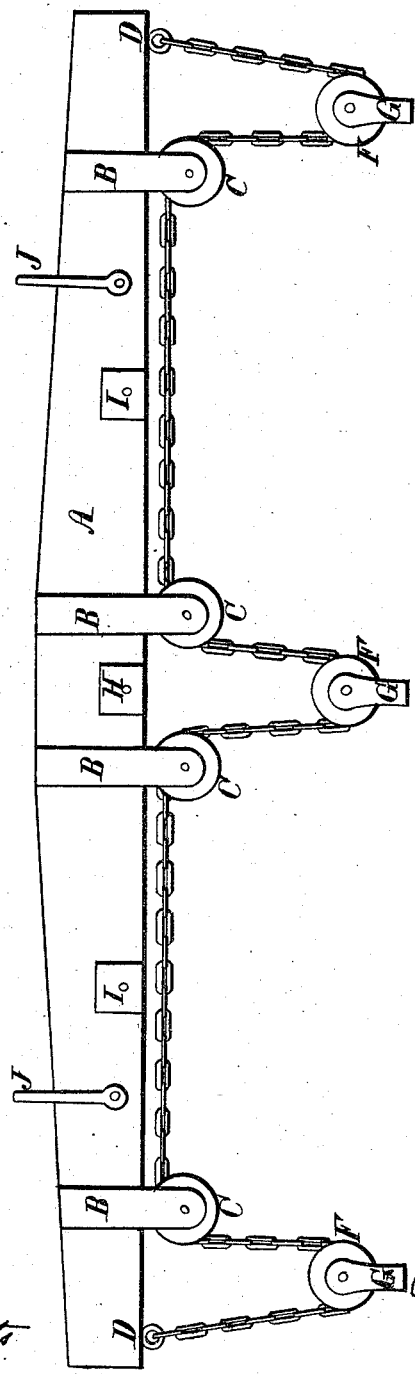

JOSEPH E. COVENEY, OF BUCHANAN, MICHIGAN.

Letters Patent No. 87,471, dated March 2, 1869.

THREE-HORSE EQUALIZER.

The Schedule referred to in these Letters Patent and making part of the same.

*To whom it may concern:*

Be it known that I, JOSEPH E. COVENEY, of Buchanan, in the county of Berrien, and State of Michigan, have invented a new and useful Improvement in Three-Horse Evener, or Equalizer; and I do declare that the following is a true and accurate description thereof, reference being had to the accompanying drawings, and to the letters of reference marked thereon, and being a part of this specification.

The object of this invention is to construct an evener, or equalizer, by which three horses can be used abreast, and which will not allow too much of the draught to be thrown upon any one of the horses, but will compel each horse to do his share of the work.

It consists of an evener-bar, A, to which are secured, by proper straps, B, the pulleys C C' C" C'".

A suitable chain or rope, K, is attached at D, near one end of the evener-bar. This chain should be nearly twice the length of the evener-bar, and should be led between the evener-bar and the pulleys C, C', C", and C'", in such a manner as to be slack, and the opposite end should be secured at E, near the other end of the evener-bar.

Between the point D and the pulley C, and between the pulleys C' and C", and between the pulley C'" and the point E, the slack, before described, should be divided, there being twice the amount of slack between the pulleys C' and C" that there is at the two other points named.

Three other pulleys, F, provided with suitable clevises, G, are hung upon the said slacks in the chain.

The horses should be attached, by proper whiffletrees, to the clevises G.

At the centre of the length of the evener-bar there should be a proper hole and plate, H, through which to pass a bolt, by means of which, and a suitable clevis, the device may be secured to a plow, harrow, &c.

In using this device attached to a wagon or mowing-machine, the attachment should be made by a proper bolt passing through one of the holes and plates I, as may be desired.

These holes and plates I, through the evener-bar, are made equidistant between the centre hole and plate H and the ends of said bar.

When it is thus attached, suitable clevises, J, are used, by means of which the longer arm of the evener-bar may be secured to the wagon, thereby preventing an unequal draught.

What I claim as my invention, and desire to secure by Letters Patent, is—

The construction of a three-horse evener, or equalizer, combining the bar A, straps B, pulleys C, C', C", C'", and F, clevises G and J, and rope or chain K, when combined, and arranged, and operating substantially as herein described.

JOSEPH E. COVENEY.

Witnesses:
LOUIS C. HYDE,
H. F. EBERTS.